(12) United States Patent
Lee et al.

(10) Patent No.: US 7,813,361 B2
(45) Date of Patent: Oct. 12, 2010

(54) SYSTEM AND METHOD FOR TRANSMITTING/RECEIVING HYBRID AUTOMATIC REPEAT REQUEST BUFFER CAPABILITY INFORMATION IN BROADBAND WIRELESS ACCESS COMMUNICATION SYSTEM

(75) Inventors: Kang-Gyu Lee, Yongin-si (KR);
Jae-Hwan Chang, Suwon-si (KR);
Yun-Sang Park, Suwon-si (KR);
Yun-Sung Kim, Yongin-si (KR); Sa-Jin Kim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 788 days.

(21) Appl. No.: 11/266,514

(22) Filed: Nov. 3, 2005

(65) Prior Publication Data
US 2006/0092960 A1 May 4, 2006

(30) Foreign Application Priority Data

| Nov. 3, 2004 | (KR) | 10-2004-0089064 |
| Jan. 11, 2005 | (KR) | 10-2005-0002701 |
| Jan. 25, 2005 | (KR) | 10-2005-0006587 |
| Jan. 26, 2005 | (KR) | 10-2005-0006941 |
| Jan. 26, 2005 | (KR) | 10-2005-0007312 |

(51) Int. Cl.
*H04L 12/28* (2006.01)
(52) U.S. Cl. .................. 370/412; 370/468
(58) Field of Classification Search ............ None
See application file for complete search history.

(56) References Cited

U.S. PATENT DOCUMENTS

| 2003/0135640 | A1 | 7/2003 | Ho et al. | |
| 2003/0157953 | A1* | 8/2003 | Das et al. | 455/522 |
| 2003/0179720 | A1* | 9/2003 | Cuny | 370/310 |
| 2004/0179469 | A1* | 9/2004 | Attar et al. | 370/208 |
| 2006/0025079 | A1* | 2/2006 | Sutskover et al. | 455/67.11 |

(Continued)

FOREIGN PATENT DOCUMENTS

EP          1 341 336          7/2005

(Continued)

OTHER PUBLICATIONS

IEEE Standard for Local and Metropolitan Area Networks: Part 16: Air Interface for Fixed and Mobile Broadband Wireless Access Systems, Amendment 2: Physical and Medium Access Control Layers for Combined Fixed and Mobile Operation in Licensed Bands and Corrigendum 1, Feb. 28, 2006, pp. 1-822.

*Primary Examiner*—Jayanti K Patel
*Assistant Examiner*—Hooman Houshmand
(74) *Attorney, Agent, or Firm*—The Farrell Law Firm, LLP

(57) ABSTRACT

Disclosed is a system and method for transmitting and receiving hybrid automatic repeat request (HARQ) buffer capability information in a broadband wireless access communication system. According to the system and method, a mobile station detects its own HARQ buffer capacity, and transmits a message including information about the detected HARQ buffer capability to a base station. The base station receives the message and determines the amount of a transmission signal to be allocated to the mobile station based on the HARQ buffer capability, so that it is possible to operate a HARQ scheme in accordance with the HARQ buffer capability of the mobile station.

20 Claims, 4 Drawing Sheets

U.S. PATENT DOCUMENTS

| | | | |
|---|---|---|---|
| 2006/0092973 A1* | 5/2006 | Petrovic et al. | 370/469 |
| 2008/0247488 A1* | 10/2008 | Li et al. | 375/299 |
| 2008/0270866 A1* | 10/2008 | Choi et al. | 714/748 |
| 2009/0034487 A1* | 2/2009 | Lohr et al. | 370/335 |

FOREIGN PATENT DOCUMENTS

| | | |
|---|---|---|
| JP | 2002-171572 | 6/2002 |
| JP | 2004-187237 | 7/2004 |
| JP | 2005-518143 | 6/2005 |
| KR | 2004-84212 | 10/2004 |
| RU | 2 235 432 | 8/2004 |
| WO | WO 03/069835 | 8/2003 |

\* cited by examiner

SYSTEM AND METHOD FOR TRANSMITTING/RECEIVING HYBRID AUTOMATIC REPEAT REQUEST BUFFER CAPABILITY INFORMATION IN BROADBAND WIRELESS ACCESS COMMUNICATION SYSTEM

PRIORITY

This application claims the benefit under 35 U.S.C. 119(a) of applications entitled "System And Method For Transmitting/Receiving Hybrid Automatic Repeat Request Buffer Capability Information In Broadband Wireless Access Communication System" filed in the Korean Intellectual Property Office on Nov. 3, 2004, Jan. 11, 2005, Jan. 25, 2005, Jan. 26, 2005 and Jan. 26, 2005, and assigned Serial Nos. 2004-89064, 2005-2701, 2005-6587, 2005-6941 and 2005-7312, respectively, the contents of each of which are incorporated herein by reference.

BACKGROUND OF THE INVENTION

1. Field of the Invention

The present invention relates to a broadband wireless access (BWA) communication system, and more particularly to a system and method for transmitting and receiving information about hybrid automatic repeat request (HARQ) buffer capability of a mobile station (MS).

2. Description of the Related Art

Fourth generation (4G) communication systems (the next generation of communication systems) are being designed to provide users with services having various qualities of service (QoSs) with a high transmission speed. Particularly, in current 4G communication systems, research is actively being conducted to develop a new type of communication system for ensuring mobility and QoS in a broadband wireless access (BWA) communication system, such as a wireless local area network (LAN) and a wireless metropolitan area network (MAN) system, in order to support high speed services. The representative communication system is the IEEE (Institute of Electrical and Electronics Engineers) 802.16d/e communication system.

The IEEE 802.16d/e communication system employs an orthogonal frequency division multiplexing/orthogonal frequency division multiple access (OFDM/OFDMA) scheme in order to enable a physical channel of the wireless MAN system to support a broadband transmission network. The structure of the IEEE 802.16e communication system will now be described with reference to FIG. 1, which schematically illustrates the structure of a typical IEEE 802.16e communication system.

The IEEE 802.16e communication system has a multi-cell structure, that is, for example, a cell 100 and a cell 150. In addition, the IEEE 802.16e communication system includes a base station (BS) 110 managing the cell 100, a base station (BS) 140 managing the cell 150, and a plurality of mobile stations (MSs) 111, 113, 130, 151, and 153. The transmission and reception of signals between the base stations 110 and 140 and the MSs 111, 113, 130, 151 and 153 are executed using the OFDM/OFDMA scheme.

Meanwhile, during data transmission, inevitable errors caused by noise, interference, and fading occur according to channel conditions, thereby causing information loss. In order to reduce this information loss, various error-control schemes are used according to the characteristics of channels to increase system reliability. A representative error-control scheme is a hybrid automatic repeat request (HARQ) scheme.

The HARQ scheme is a new error-control scheme which is produced by combining the advantages of an automatic retransmission request (ARQ) scheme and a forward error correction (FEC) scheme.

According to the HARQ scheme, an acknowledgment/non-acknowledgment (ACK/NACK) signal in response to a signal transmitted from a transmitter is fedback from a receiver to the transmitter, and the transmitter retransmits the transmitted signal when receiving the NACK signal from the receiver, thereby improving the reliability of transmission. The receiver feeds the ACK signal back to the transmitter when receiving a signal without error transmitted from the transmitter, and the receiver feeds the NACK signal back to the transmitter when receiving an abnormal signal from the transmitter, that is, when there is an error in the signal transmitted from the transmitter. In this case, when the HARQ scheme is employed, a transmitted signal has a unit of an HARQ encoder packet (Hep). One Hep is generated by inserting a cyclic redundancy check (CRC) code into one Medium Access Control-Protocol Data Unit (MAC-PDU) or a plurality of MAC-PDUs concatenated with each other.

Currently, the IEEE 802.16d/e system supports two types of HARQ schemes, that is a first type (type-I) HARQ scheme and a second type (type-II) HARQ scheme. In the following description, the two types of HARQ schemes will be described.

According to the type-I HARQ scheme, which is also called a "chase combining (CC)" scheme, a transmitter transmits signals of the same format upon initial transmission and retransmission. Then, a receiver receives signals transmitted from the transmitter upon the initial transmission and the retransmission, soft-combines two received signals, and then decodes the soft-combined signals.

According to the type-II HARQ scheme, which is also called a "incremental redundancy (IR)" scheme, a transmitter transmits signals of different formats upon initial transmission and retransmission. Then, a receiver code-combines signals transmitted from the transmitter upon the initial transmission and the retransmission, and then decodes the code-combined signals.

As described above, the IEEE802.16d/e communication system supports two types of HARQ schemes. In order to realize the HARQ scheme, it is necessary to exchange parameters between an MS and a base station (BS) for the HARQ scheme when the MS performs an initialization or handover operation. However, in the current IEEE 802.16d/e communication system, parameters exchanged for the HARQ scheme operation upon the initialization or handover of an MS does not include any parameter relating to the buffer capability of the MS.

When the HARQ scheme operates without regard to the buffer capability of the MS, the following problems occur:

First, since a base station does not know the buffer capability of an MS at all, the base station may determine a size of Hep beyond the capacity of the MS. In this case, it is impossible for the MS to receive the Hep transmitted from the base station, thereby causing unnecessary retransmission due to the abnormal reception of the Hep.

Second, an MS must have not only a first memory capacity required for the combining operation with respect to erroneous Heps, but also a second memory capacity required for reordering MAC-PDUs, which have been generated by decoding normal Heps, in order to transmit the MAC-PDUs to an upper layer. When the MS does not secure the memory capacity required for the combining and reordering, it is impossible for the MS to receive a Hep transmitted from the base station, thereby causing unnecessary retransmission due to abnormal reception of the Hep.

As described above, when the HARQ scheme operates without regard to the buffer capability of an MS, an unnecessary retransmission of a Hep occurs. Such an unnecessary retransmission of an Hep causes traffic delay and unnecessary resource allocation, thereby degrading the performance of the entire system.

SUMMARY OF THE INVENTION

Accordingly, the present invention has been made to solve the above-mentioned problems occurring in the prior art, and an object of the present invention is to provide a system and method for transmitting and receiving the hybrid automatic repeat request (HARQ) buffer capability information in a broadband wireless access communication system.

Another object of the present invention is to provide a system and method for transmitting and receiving the HARQ buffer capability information upon the initialization or handover of an MS in a broadband wireless access communication system, so as to prevent unnecessary retransmission of a HARQ encoder packet (Hep).

To accomplish these objects, in accordance with one aspect of the present invention, there is provided a system for transmitting hybrid automatic repeat request (HARQ) buffer capability information in a broadband wireless access communication system, the system including a HARQ buffer; a controller for detecting the capability of the HARQ buffer, generating information for representing the detected HARQ buffer capability, and controlling a transmitter to create a message including the generated information; and the transmitter for creating the message according to the control of the controller, and transmitting the created message to a base station.

In accordance with another aspect of the present invention, there is provided a system for receiving hybrid automatic repeat request (HARQ) buffer capability information in a broadband wireless access communication system, the system including a receiver for receiving a message which includes information representing HARQ buffer capability of a mobile station; and a controller for determining an amount of a transmission signal to be allocated to the mobile station based on the information.

In accordance with still another aspect of the present invention, there is provided a system for transmitting hybrid automatic repeat request (HARQ) buffer capability information in a broadband wireless access communication system, the system including a HARQ buffer; a controller for detecting the HARQ buffer capability, setting "b7" to "b0" as bits to represent HARQ buffer capability for a downlink and setting "b15" to "b8" as bits to represent HARQ buffer capability for an uplink when a HARQ buffer capability field for representing the HARQ buffer capability has 16 bits of "b15" to "b0", and then controlling a transmitter to generate a subscriber station's basic capability negotiation request (SBC-REQ) message including the HARQ buffer capability field, in which "b7" to "b5" are set as reserved bits, "b4" is set to represent if the HARQ buffer capability represents a total HARQ buffer capability, "b3" to "b0" are set to represent a packet size (Nep) per HARQ channel, "b15" to "b13" are set as reserved bits, "b12" is set to represent if the HARQ buffer capability represents a total HARQ buffer capability, and "b11" to "b8" are set to represent a Nep according to the control of the controller; and the transmitter for generating and transmitting the subscriber station's basic capability negotiation request message to a base station according to the control of the controller.

In accordance with still another aspect of the present invention, there is provided a system for receiving hybrid automatic repeat request (HARQ) buffer capability information in a broadband wireless access communication system, the system including a receiver for receiving a subscriber station's basic capability negotiation request message which includes a HARQ buffer capability field for representing HARQ buffer capability information of a mobile station; and a controller for determining an amount of a transmission signal to be allocated to the mobile station based on the HARQ buffer capability information included in the HARQ buffer capability field, wherein "b7" to "b0" are set as bits to represent HARQ buffer capability for a downlink and "b15" to "b8" are set as bits to represent HARQ buffer capability for an uplink when a HARQ buffer capability field for representing the HARQ buffer capability has 16 bits of "b15 to "b0", in which "b7" to "b5" are set as reserved bits, "b4" is set to represent if the HARQ buffer capability represents a total HARQ buffer capability, "b3" to "b0" are set to represent a packet size (Nep) per HARQ channel, "b15" to "b13" are set as reserved bits, "b12" is set to represent if the HARQ buffer capability represents a total HARQ buffer capability, and "b11" to "b8" are set to represent a Nep.

In accordance with still another aspect of the present invention, there is provided a method for transmitting hybrid automatic repeat request (HARQ) buffer capability information in a broadband wireless access communication system, the method including detecting its own HARQ buffer capability by a mobile station; and transmitting a message, which includes information representing the detected HARQ buffer capability, to a base station.

In accordance with still another aspect of the present invention, there is provided a method for receiving hybrid automatic repeat request (HARQ) buffer capability information in a broadband wireless access communication system, the method including receiving a message which includes information representing HARQ buffer capability of a mobile station; and determining an amount of a transmission signal to be allocated to the mobile station based on the information.

In accordance with still another aspect of the present invention, there is provided a method for transmitting hybrid automatic repeat request (HARQ) buffer capability information in a broadband wireless access communication system. The method comprises the steps of detecting its own HARQ buffer capability for a downlink and an uplink by a mobile station; setting "b7" to "b0" as bits to represent information representing HARQ buffer capability for the downlink when a HARQ buffer capability field for representing the information representing the detected downlink and uplink HARQ buffer capability has 16 bits of "b15 to "b0", in which "b7" to "b5" are set as reserved bits, "b4" is set to represent if the downlink HARQ buffer capability represents total downlink HARQ buffer capability, and "b3" to "b0" are set to represent a packet size (Nep) per HARQ channel; setting "b15" to "b8" as bits to represent information representing HARQ buffer capability for the uplink, in which "b15" to "b13" are set as reserved bits, "b12" is set to represent if the uplink HARQ buffer capability represents total uplink HARQ buffer capability, and "b11" to "b8" are set to represent a Nep; and transmitting a subscriber station (SS) basic capability negotiation request (SBC-REQ) message including the HARQ buffer capability field to a base station.

In accordance with still another aspect of the present invention, there is provided a method for receiving hybrid automatic repeat request (HARQ) buffer capability information in a broadband wireless access communication system. The method comprises the steps of: receiving a subscriber station (SS) basic capability negotiation request (SBC-REQ) message, which includes a HARQ buffer capability field for representing downlink and uplink HARQ buffer capability information of a mobile station; and determining an amount of a transmission signal for the mobile station based on the HARQ buffer capability information included in the HARQ buffer capability field, wherein, "b7" to "b0" are set as bits to represent the downlink HARQ buffer capability information when the HARQ buffer capability field has 16 bits of "b15 to b0", in which "b7" to "b5" are set as reserved bits, "b4" is set to represent if the downlink HARQ buffer capability represents total downlink HARQ buffer capability, and "b3" to "b0" are set to represent a packet size (Nep) per HARQ channel; and "b15" to "b8" are set as bits to represent the uplink HARQ buffer capability information, in which "b15" to "b13" are set as reserved bits, "b12" is set to represent if the uplink HARQ buffer capability represents total uplink HARQ buffer capability, and "b11" to "b8" are set to represent a Nep.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments according to the present invention will be described with reference to the accompanying drawings. In the following description of the embodiments of the present invention, a detailed description of known functions and configurations incorporated herein will be omitted when it may obscure the subject matter of the present invention.

The present invention provides a system and method for transmitting and receiving hybrid automatic repeat request (HARQ) buffer capability information in the IEEE (Institute of Electrical and Electronics Engineers) 802.16d/e communication system which is a broadband wireless access (BWA) communication system. Particularly, the present invention provides a system and method for operating the HARQ scheme in consideration of the HARQ buffer capability of a mobile station (MS) in the IEEE 802.16d/e communication system, by allowing an MS to negotiate with the base station in relation to the HARQ buffer capability of the MS upon the initialization or handover operation of the MS. Although the present invention is described with respect to the IEEE 802.16d/e communication system as an example, it is obvious that the present invention can be applied to other communication systems employing the HARQ scheme, as well as the IEEE 802.16d/e communication system.

In addition, it should be noted that the general operations for initialization and handover of an MS in the IEEE 802.16d/e communication system are applied to the present invention, except for the operation of transmitting and receiving information about the HARQ buffer capability of the MS. Therefore, a detailed description of the operations according to the initialization and handover of the MS will be omitted, except for the operation of transmitting and receiving information about the HARQ buffer capability of the MS.

Figure 1:
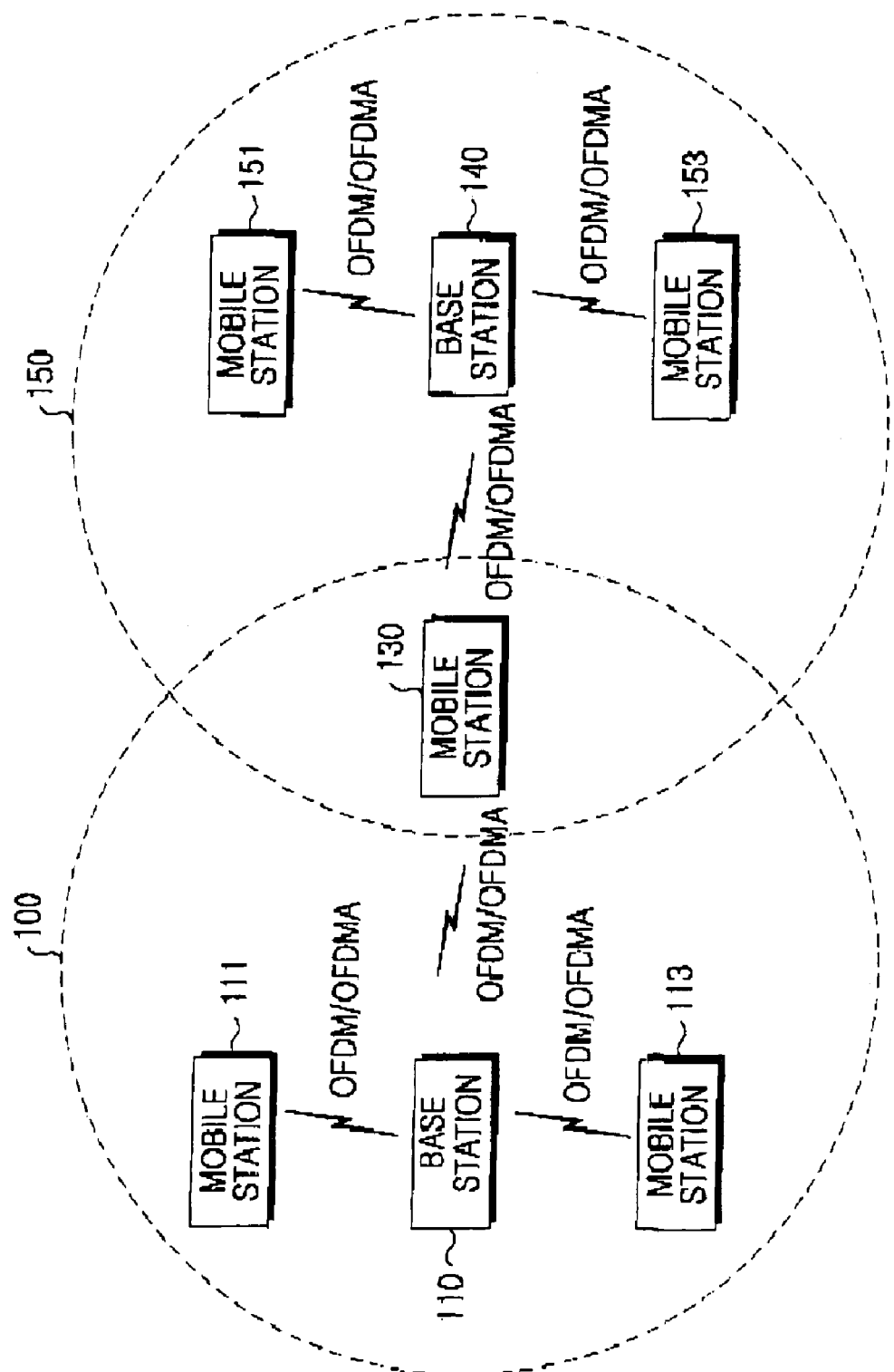
FIG. 1 is a block diagram schematically illustrating the structure of a typical IEEE 802.16e communication system.
Figure 2:
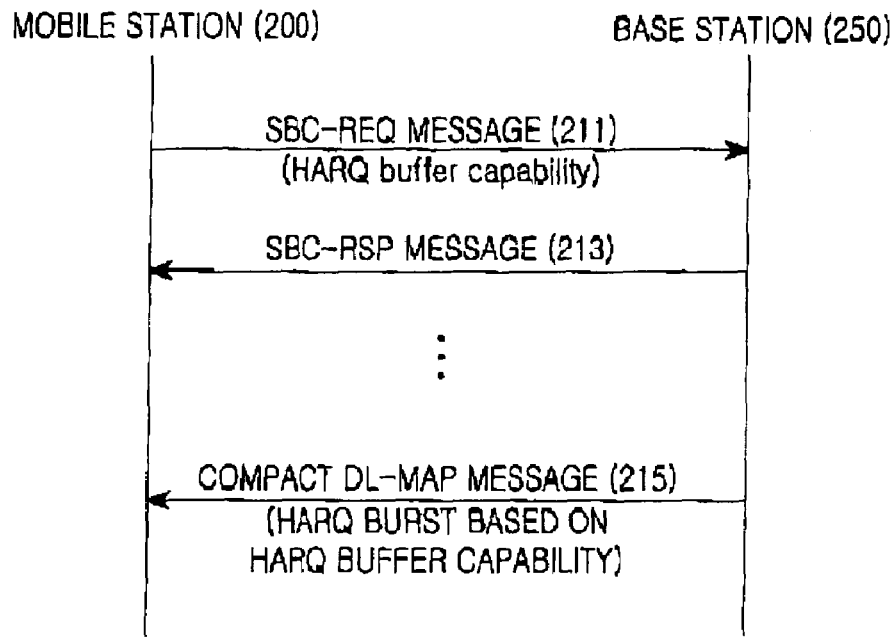
FIG. 2 is a flow diagram schematically illustrating the operation of transmitting and receiving HARQ buffer capability information in the IEEE 802.16d/e communication system according to a first embodiment of the present invention.

FIG. 2 is a flow diagram schematically illustrating the operation of transmitting and receiving HARQ buffer capability information in the IEEE 802.16d/e communication system according to a first embodiment of the present invention.

First, it is assumed in the first embodiment of the present invention that information about the HARQ buffer capability of an MS is transmitted and received between the MS and a base station upon the initialization or handover of the MS, by transmitting and receiving a subscriber station (SS) basic capability negotiation request (SBC-REQ) message and a subscriber station basic capability negotiation response (SBC-RSP) message.

Referring to FIG. 2, first, an MS 200 detects its own HARQ buffer capability and transmits an SBC-REQ message to a base station 250 in step 211. Herein, the SBC-REQ message is a Medium Access Control (MAC) message transmitted in order for the MS 200 to negotiate with the base station 250 in relation to a basic capability. The SBC-REQ message includes information about modulation and coding schemes which the MS 200 can support. Particularly, the SBC-REQ message according to the first embodiment of the present invention further includes a HARQ buffer capability field, in which the buffer capacity of the MS 200 is recorded. The HARQ buffer capability information of the MS 200 may be recorded in the HARQ buffer capability field based on the three types described below. The HARQ buffer capability can be expressed in an index form predetermined between the MS and a base station, or expressed in maximal number of data bits the MS is able to store for uplink/downlink HARQ.

Type 1

According to the first type, Type 1, the MS 200 records its own HARQ buffer capability information in an index form predetermined between the MS 200 and the base station 250. In this case, both the MS 200 and the base station 250 has secured a HARQ buffer capability index table as shown in Table 1 in advance. Therefore, the MS 200 and the base station 250 can recognize the HARQ buffer capability information of the MS 200 based on the index form.

TABLE 1

| Index | Buffer capability | $N^{EP}$ (bits) | Number of H-ARQ channels |
|---|---|---|---|
| 0 ... 15 | A × (144 × N), N = 1 ... 16 | 144 | 1 ... 16 |
| 16 ... 31 | A × (192 × N), N = 1 ... 16 | 192 | 1 ... 16 |

TABLE 1-continued

| Index | Buffer capability | $N^{EP}$ (bits) | Number of H-ARQ channels |
|---|---|---|---|
| 32 ... 47 | A × (288 × N), N = 1 ... 16 | 288 | 1 ... 16 |
| 48 ... 63 | A × (384 × N), N = 1 ... 16 | 384 | 1 ... 16 |
| 64 ... 79 | A × (480 × N), N = 1 ... 16 | 480 | 1 ... 16 |
| 80 ... 95 | A × (960 × N), N = 1 ... 16 | 960 | 1 ... 16 |
| 96 ... 111 | A × (1920 × N), N = 1 ... 16 | 1920 | 1 ... 16 |
| 112 ... 127 | A × (2880 × N), N = 1 ... 16 | 2880 | 1 ... 16 |
| 128 ... 143 | A × (3840 × N), N = 1 ... 16 | 3840 | 1 ... 16 |
| 144 ... 159 | A × (4800 × N), N = 1 ... 16 | 4800 | 1 ... 16 |
| 160 ... 175 | A × (9600 × N), N = 1 ... 16 | 9600 | 1 ... 16 |
| 176 ... 191 | A × (14400 × N), N = 1 ... 16 | 14400 | 1 ... 16 |
| 192 ... 207 | A × (19200 × N), N = 1 ... 16 | 19200 | 1 ... 16 |
| 208 ... 223 | A × (24000 × N), N = 1 ... 16 | 24000 | 1 ... 16 |

As shown in Table 1, HARQ buffer capability information corresponding to each index, $N^{EP}$ representing a packet size "Nep" per HARQ channel, and the number of HARQ channels are mapped and stored in the HARQ buffer capability index table.

The MS 200 transmits, to the base station 250, an SBC-REQ message including the HARQ buffer capability field, in which an index corresponding to the HARQ buffer capability information of the MS 200 has been recorded. Then, the base station 250 searches its own HARQ buffer capability index table for the index recorded in the HARQ buffer capability field of the SBC-REQ message, and identifies the HARQ buffer capability information of the MS 200. The base station 250 determines the amount of a transmission signal to be allocated to the MS 200, based on the identified HARQ buffer capability information of the MS 200.

Type 2

According to the second type, Type 2, the MS 200 records the actual total HARQ buffer capability as its own HARQ buffer capability information. The MS 200 transmits an SBC-REQ message including the HARQ buffer capability field, in which the total HARQ buffer capability of the MS 200 has been recorded, to the base station 250. Then, the base station 250 detects the total HARQ buffer capability of the MS 200, which has been recorded in the HARQ buffer capability field of the SBC-REQ message, and controls the amount of a transmission signal corresponding to a "Nep" allocated to the MS 200.

Type 3

According to the third type, Type 3, the MS 200 recodes its own HARQ buffer capability information as a Nep. The MS 200 transmits an SBC-REQ message including the HARQ buffer capability field, in which the Nep is recorded, to the base station 250. Then, the base station 250 detects the Nep recorded in the HARQ buffer capability field of the SBC-REQ message, and controls the amount of a transmission signal corresponding to a Nep allocated to the MS 200. In Type 3, that is, when the MS 200 records its own HARQ buffer capability information in the form of Nep, the HARQ buffer capability field included in the SBC-REQ message may have various formats as described blow.

A first format for the HARQ buffer capability field will now be described.

First, when the HARQ buffer capability field is represented with 8 bits of "b7" to "b0", the upper 4 bits are determined to express a value of "0" or "1". Herein, the value of "0" represents the total HARQ buffer capability, and the value of "1" represents the HARQ buffer capability per one HARQ channel. In the remaining lower 4 bits, the HARQ buffer capability is recorded as the number of bits or as a "Nep". In addition, it is also required to inform the base station 250 of the number of HARQ channels allocated to the MS 200. The number of HARQ channels allocated to the MS 200 may be included in the HARQ buffer capability field or may be included in another field included in the SBC-REQ message.

Therefore, when the upper 4 bits have a value of "0", a Nep per HARQ channel can be obtained by dividing the total HARQ buffer capability recorded in the lower 4 bits by the number of HARQ channels allocated to the MS 200. In contrast, when the upper 4 bits have a value of "1", the total HARQ buffer capability can be obtained by multiplying the Nep recorded in the lower 4 bits by the number of HARQ channels allocated to the MS 200.

A second format for the HARQ buffer capability field will now be described.

First, when the HARQ buffer capability field is represented with 8 bits of "b7" to "b0", the upper 3 bits of "b7" to "b5" are set as reserved bits, and the next bit of "b4" has a value representing whether this format represents a HARQ buffer capability. In the remaining bits of "b3" to "b0", the number of bits or a "Nep" is recorded.

Meanwhile, the MS 200 must notify the base station 250 of HARQ buffer capabilities for both uplink and downlink. In addition, since two types of schemes, that is, a chase combining (CC) scheme (type-I scheme) and an incremental redundancy (IR) scheme (type-II scheme) are supported in the IEEE 802.16d/e communication system, the MS 200 must notify the base station 250 of HARQ buffer capabilities for both the CC scheme and the IR scheme.

Therefore, for example, in the case of the second HARQ buffer capability format of Type 3, downlink HARQ buffer capability information for any one HARQ scheme of the CC and IR schemes is recorded in one byte, that is, in 8 bits of "b7" to "b0", as described above, and uplink HARQ buffer capability information for any one HARQ scheme of the CC and IR schemes is recorded in another byte, that is, in 8 bits of "b15" to "b8". In this case, the scheme for recording the uplink HARQ buffer capability information is the same as that used for recording the downlink HARQ buffer capability information, except that they use different bits, so a detailed description of the scheme of recording the uplink HARQ buffer capability information will be omitted.

Referring back to FIG. 2, when the base station 250 receives the SBC-REQ message from the MS 200, the base station 250 transmits an SBC-RSP message to the MS 200 in response to the SBC-REQ message in step 213. Herein, the SBC-RSP message also includes the HARQ buffer capability field. The base station 250 can recognize the HARQ buffer capability of the MS 200 through the HARQ buffer capability field included in the SBC-REQ message. Therefore, the base station 250 determines the amount of a transmission signal to be allocated to the MS 200 based on the HARQ buffer capability information of the MS 200, and informs the MS 200 of information about a HARQ burst, which has been allocated based on the determined amount of the transmission signal, through a compact downlink MAP (Compact DL-MAP) message in step 215.

The operation of transmitting and receiving HARQ buffer capability information in the IEEE 802.16d/e communication system according to the first embodiment of the present invention has been described with reference to FIG. 2. Hereinafter, the operation of transmitting and receiving HARQ buffer capability information in the IEEE 802.16d/e communication system according to a second embodiment of the present invention will be described with reference to the flow diagram of FIG. 3.

First, it is assumed in the second embodiment of the present invention that information about the HARQ buffer capability of an MS is transmitted and received between the MS and a base station upon the initialization or handover of the MS, by transmitting and receiving a registration request (REG-REQ) message and a registration response (REG-RSP) message.

Figure 3:
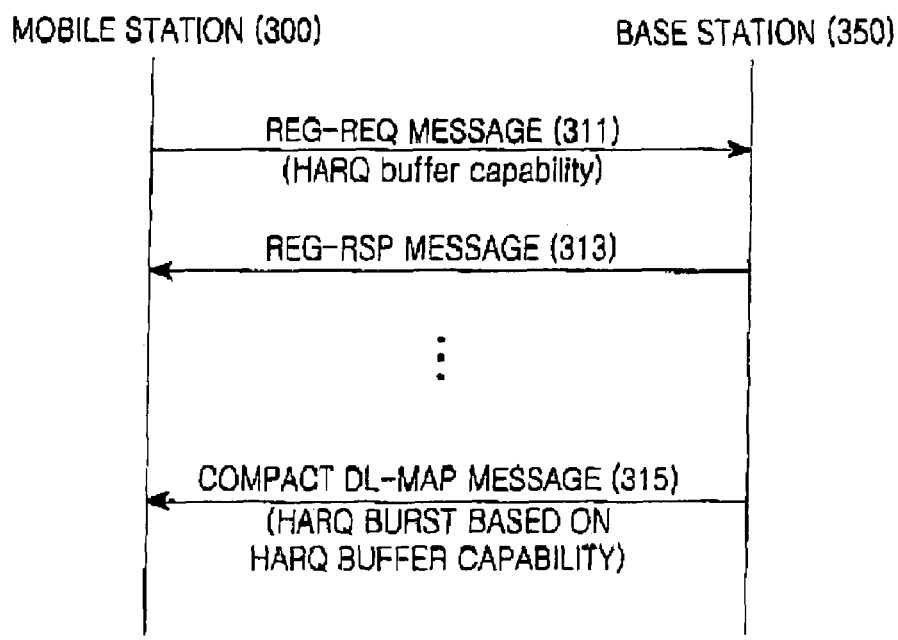
FIG. 3 is a flow diagram schematically illustrating the operation of transmitting and receiving HARQ buffer capability information in the IEEE 802.16d/e communication system according to a second embodiment of the present invention.

Referring to FIG. 3, first, an MS 300 detects its own HARQ buffer capability information and transmits a REG-REQ message to a base station 350 in step 311. Herein, the REG-REQ message includes MS registration information of the MS 300. Particularly, according to the second embodiment of the present invention, a HARQ buffer capability field is additionally included in the REG-REQ message, and the HARQ buffer capability information of the MS 300 is recorded in the HARQ buffer capability field. Herein, since the scheme for recording the HARQ buffer capability information of the MS 300 is the same as that used for recording a HARQ buffer capability information in the HARQ buffer capability field of the SBC-REQ message, which is described according to the first embodiment of the present invention, a detailed description of such will be omitted.

When the base station 350 receives the REG-REQ message from the MS 300, the base station 350 transmits a REG-RSP message to the MS 300 in response to the REG-REQ message in step 313. Herein, the REG-RSP message also includes the HARQ buffer capability field. The base station 350 can recognize the HARQ buffer capability of the MS 300 through the HARQ buffer capability field included in the REG-REQ message. Therefore, the base station 350 determines the amount of a transmission signal to be allocated to the MS 300 based on the HARQ buffer capability of the MS 300, and informs the MS 300 of information about a HARQ burst, which has been allocated based on the determined amount of a transmission signal, through a Compact DL-MAP message in step 315.

The operation of transmitting and receiving HARQ buffer capability information in the IEEE 802.16d/e communication system according to the second embodiment of the present invention has been described with reference to FIG. 3. Hereinafter, the operation of transmitting and receiving HARQ buffer capability information in the IEEE 802.16d/e communication system, according to a third embodiment of the present invention, will be described with reference to the flow diagram of FIG. 4.

First, it is assumed in the third embodiment of the present invention that information about the HARQ buffer capability of an MS is transmitted and received between the MS and a base station upon the initialization or handover of the MS, by transmitting and receiving a ranging request (RNG-REQ) message and a ranging response (RNG-RSP) message.

Figure 4:
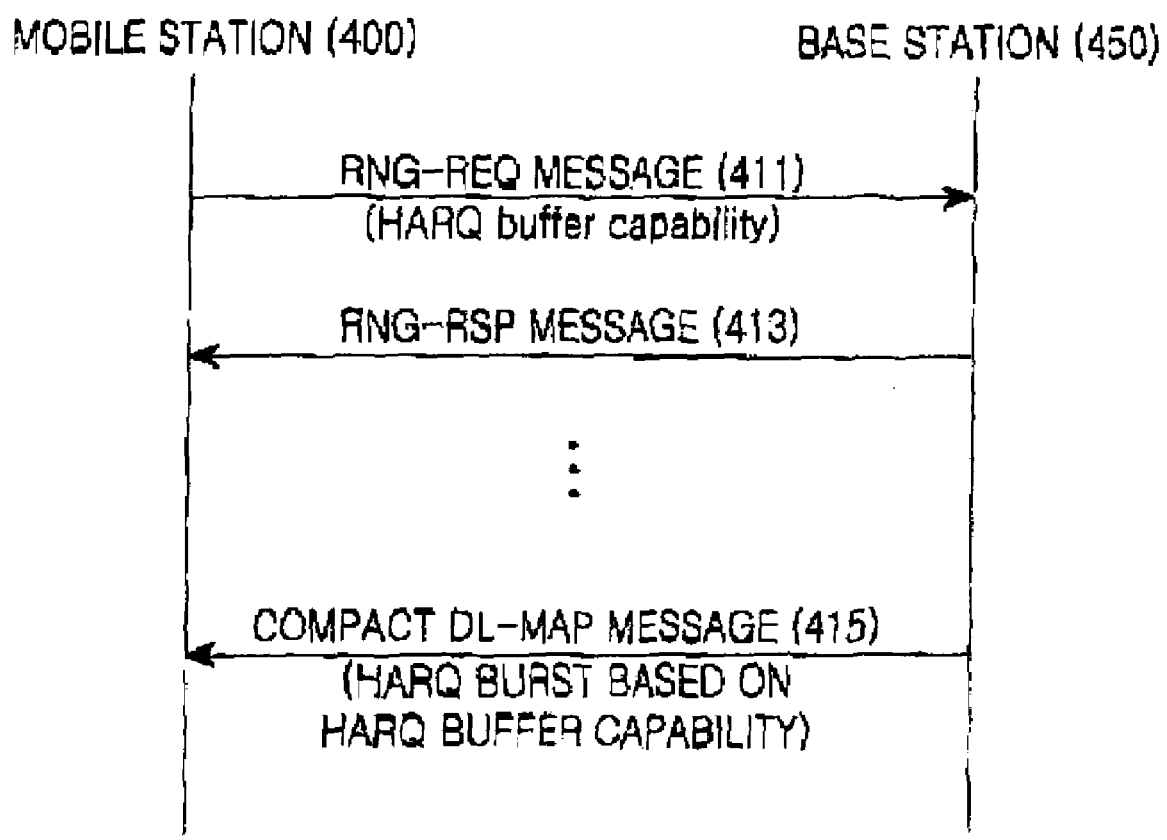
FIG. 4 is a flow diagram schematically illustrating the operation of transmitting and receiving HARQ buffer capability information in the IEEE 802.16d/e communication system according to a third embodiment of the present invention.

Referring to FIG. 4, first, an MS 400 detects its own HARQ buffer capability information and transmits an RNG-REQ message to a base station 450 in step 411. Particularly, according to the third embodiment of the present invention, a HARQ buffer capability field is additionally included in the RNG-REQ message, and the HARQ buffer capability information of the MS 400 is recorded in the HARQ buffer capability field. Herein, since the scheme for recording the buffer capability of the MS 400 is the same as that used for recording a buffer capability in the HARQ buffer capability field of the SBC-REQ message, which is described according to the first embodiment of the present invention, a detailed description of such will be omitted.

When the base station 450 receives the RNG-REQ message from the MS 400, the base station 450 transmits an RNG-RSP message to the MS 400 in response to the RNG-REQ message in step 413. Herein, the RNG-RSP message also includes the HARQ buffer capability field. The base station 450 can recognize the HARQ buffer capability of the MS 400 through the HARQ buffer capability field included in the RNG-REQ message. Therefore, the base station 450 determines the amount of a transmission signal to be allocated to the MS 400 based on the HARQ buffer capability of the MS 400, and informs the MS 400 of information about a HARQ burst, which has been allocated based on the determined amount of a transmission signal, through a Compact DL-MAP message in step 415.

The operation of transmitting and receiving HARQ buffer capability information in the IEEE 802.16d/e communication system according to the third embodiment of the present invention has been described with reference to FIG. 4. Hereinafter, the internal structure of an MS according to an embodiment of the present invention will be described with reference to the block diagram of FIG. 5.

The MS includes a HARQ buffer 511, a controller 513, and a transmitter 515. The HARQ buffer 511 supports the HARQ scheme of the MS, and stores received HARQ encoder packets (Hep) and Medium Access Control-Protocol Data Units (MAC-PDUs), which are generated by decoding normal Heps and are reordered for transmission to an upper layer. The controller 513 detects the HARQ buffer capability of the HARQ buffer 511, generates information to be recorded in a HARQ buffer capability field based on the detected HARQ buffer capability, and outputs the generated information, i.e., HARQ buffer capability information to the transmitter 515. The transmitter 515 records HARQ buffer capability information generated by the controller 513 or information obtained based on the generated information in the HARQ buffer capability field of a message (that is, SBC-REQ message, REG-REQ message, or RNG-REQ message) to be transmitted, and then outputs the relevant message to the base station.

Figure 5:
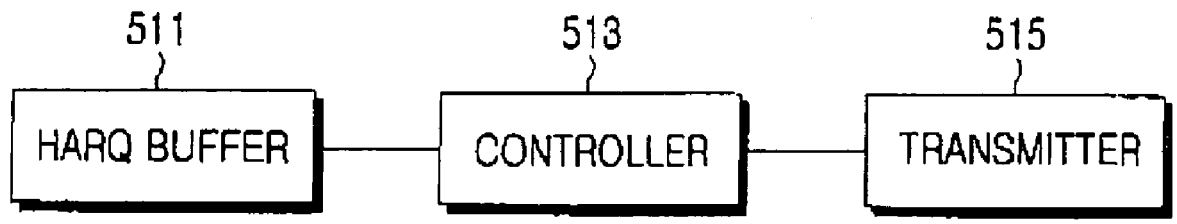
FIG. 5 is a block diagram schematically illustrating the internal structure of an MS according to an embodiment of the present invention.
Figure 6:
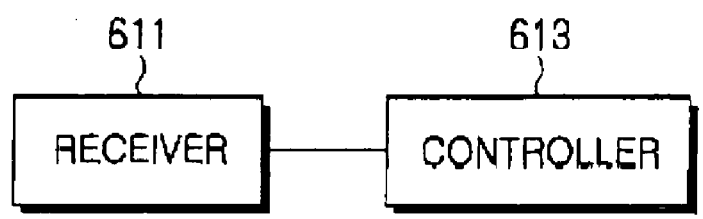
FIG. 6 is a block diagram schematically illustrating the internal structure of a base station according to an embodiment of the present invention.

The internal structure of an MS according to an embodiment of the present invention has been described with reference to FIG. 5. Hereinafter, the internal structure of a base station according to an embodiment of the present invention will be described with reference to the block diagram of FIG. 6.

The base station includes a receiver 611 and a controller 613.

The receiver 611 receives a relevant message (that is, SBC-REQ message, REG-REQ message, or RNG-REQ message) from an MS, and outputs information about the HARQ buffer capability of the MS, which has been recorded in the HARQ buffer capability field of the received message, to the controller 613. The controller 613 determines the amount of a transmission signal to be allocated to the MS based on the HARQ buffer capability information output from the receiver 611, so as to transmit a signal suitable for the HARQ buffer capability of the MS.

According to the present invention as described above, information about the HARQ buffer capability of an MS is reported to a base station in a broadband wireless access communication system, so that the base station can operate a HARQ scheme in accordance with the HARQ buffer capability of the MS. Accordingly, since unnecessary signal retransmission due to abnormal signal reception of the MS is prevented, traffic delay and unnecessary resource allocation are prevented, thereby improving the performance of the entire system.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but is defined by the claims and the equivalents thereof.

What is claimed is:

1. A method for transmitting Hybrid Automatic Repeat reQuest (HARQ) buffer capability information by a Mobile Station (MS) in a broadband wireless access communication system, the method comprising:

transmitting, to a Base Station (BS), a Subscriber Station (SS) Basic Capability negotiation REQuest (SBC-REQ) message including HARQ buffer capability information having downlink HARQ buffer capability information indicating a downlink HARQ buffer capability, and uplink HARQ buffer capability information indicating an uplink HARQ buffer capability, wherein the downlink HARQ buffer capability information indicates a maximal number of data bits the MS is able to store for a downlink HARQ and includes one of a first type indicating a downlink HARQ buffer capability for total downlink HARQ channels and a second type indicating a downlink HARQ buffer capability for each downlink HARQ channel, and wherein the uplink HARQ buffer capability information indicates a maximal number of data bits the MS is able to store for an uplink HARQ and includes one of indicating an uplink HARQ buffer capability for total uplink HARQ channels and indicating an uplink HARQ buffer capability for each uplink HARQ channel.

2. The method as claimed in claim 1, wherein each of the downlink and uplink HARQ buffer capabilities is available for an Incremental Redundancy scheme.

3. The method as claimed in claim 1, wherein each of the downlink and uplink HARQ buffer capabilities is available for a Chase Combining (CC) scheme or both of an Incremental Redundancy scheme and the CC scheme.

4. The method as claimed in claim 1, wherein the downlink HARQ buffer capability information further includes a bit indicating whether the downlink HARQ buffer capability information includes the first type or the second type, and the uplink HARQ buffer capability information further includes a bit indicating whether the uplink HARQ buffer capability information includes one of the indication of the uplink HARQ buffer capability for the total uplink HARQ channels and the indication of the uplink HARQ buffer capability for each uplink HARQ channel.

5. A method for receiving Hybrid Automatic Repeat reQuest (HARQ) buffer capability information by a Base Station (BS) in a broadband wireless access communication system, the method comprising:

receiving, from a Mobile Station (MS), a Subscriber Station (SS) Basic Capability negotiation REQuest (SBC-REQ) message including HARQ buffer capability information having downlink HARQ buffer capability information indicating a downlink HARQ buffer capability, and uplink HARQ buffer capability information indicating an uplink HARQ buffer capability, wherein the downlink HARQ buffer capability information indicates a maximal number of data bits in the MS is able to store for a downlink HARQ and includes one of a first type indicating a downlink HARQ buffer capability for total downlink HARQ channels and a second type indicating a downlink HARQ buffer capability for each downlink HARQ channel, and wherein the uplink HARQ buffer capability information indicates a maximal number of data bits the MS is able to store for an uplink HARQ and includes one of indicating an uplink HARQ buffer capability for total uplink HARQ channels and indicating an uplink HARQ buffer capability for each HARQ channel.

6. The method as claimed in claim 5, wherein each of the downlink and uplink HARQ buffer capabilities is available for an Incremental Redundancy scheme.

7. The method as claimed in claim 5, wherein each of the downlink and uplink HARQ buffer capabilities is available for a Chase Combining (CC) scheme or both of an Incremental Redundancy scheme and the CC scheme.

8. The method as claimed in claim 5, wherein the downlink HARQ buffer capability information further includes a bit indicating whether the downlink HARQ buffer capability information includes the first type or the second type, and the uplink HARQ buffer capability information further includes a bit indicating whether the uplink HARQ buffer capability information includes one of the indication of the uplink HARQ buffer capability for the total uplink HARQ channels and the indication of the uplink HARQ buffer capability for each uplink HARQ channel.

9. A method for transmitting Hybrid Automatic Repeat reQuest (HARQ) buffer capability information by a Mobile Station (MS) in a broadband wireless access communication system, the method comprising:

transmitting, to a Base Station (BS), a Subscriber Station (SS) Basic Capability negotiation REQuest (SBC-REQ) message including HARQ buffer capability information having downlink HARQ buffer capability information indicating a downlink HARQ buffer capability, and uplink HARQ buffer capability information indicating an uplink HARQ buffer capability, wherein, when the HARQ buffer capability information is indicated using 16 bits from b15 to b0, the downlink HARQ buffer capability information is indicated using 8 bits b7 to b0, and 3 bits b7 to b5 are set as reserved bits, 1 bit b4 is set to indicate whether the downlink HARQ buffer capability represents one of a downlink HARQ buffer capability for the total downlink HARQ channels and a packet size (Nep) per downlink HARQ channel, and 4 bits b3 to b0 are set to indicate the Nep per downlink HARQ channel when 1 bit b4 indicates that the downlink HARQ buffer capability represents the Nep per downlink HARQ channel, wherein the uplink HARQ buffer capability information is indicated using 8 bits b15 to b8, 3 bits b15 to b13 are set as reserved bits, 1 bit b12 is set to indicate whether the uplink HARQ buffer capability represents one of a uplink HARQ buffer capability for total uplink HARQ channels and an Nep per uplink HARQ channel, and 4 bits b11 to b8 are set to indicate the Nep per uplink HARQ channel when 1 bit b12 indicates that the uplink HARQ buffer capability for the total uplink HARQ channels represents the Nep per uplink HARQ channel, and wherein the downlink and uplink HARQ buffer capabilities are available for an Incremental Redundancy scheme.

10. A method for receiving Hybrid Automatic Repeat reQuest (HARQ) buffer capability information by a Base Station (BS) in a broadband wireless access communication system, the method comprising:

receiving, from a Mobile Station (MS), a Subscriber Station (SS) Basic Capability negotiation REQuest (SBC-REQ) message including HARQ buffer capability information having downlink HARQ buffer capability information indicating a downlink HARQ buffer capability, and uplink HARQ capability information indicating an uplink HARQ buffer capability, wherein, when the HARQ buffer capability information is indicated using 16 bits from b15 to b0, the downlink HARQ buffer capability information is indicated using 8 bits b7 to b0, and 3 bits b7 to b5 are set as reserved bits, 1 bit b4 is set to indicate whether the downlink HARQ buffer capability represents one of a downlink HARQ buffer capability for total downlink HARQ channels and a packet size (Nep) per downlink HARQ channel, and 4 bits b3 to b0 are set to indicate the Nep per downlink HARQ channel when 1 bit b4 indicates that the downlink HARQ buffer capability represents the Nep per downlink HARQ channel, wherein the uplink HARQ buffer capability information is indicated using 8 bits b5 to b8, 3 bits b15 to b13 are set as reserved bits, 1 bit b12 is set to indicate whether the uplink HARQ buffer capability represents one of an uplink HARQ buffer capability for total uplink HARQ channels and an Nep per uplink HARQ channel, and 4 bits b11 to b8 are set to indicate the Nep per uplink HARQ channel when 1 bit b12 indicates that the uplink HARQ buffer capability for the total uplink HARQ channels represents the Nep per uplink HARQ channel, and wherein the downlink and uplink HARQ buffer capabilities are available for an Incremental Redundancy scheme.

11. A system for transmitting Hybrid Automatic Repeat reQuest (HARQ) buffer capability information in a broadband wireless access communication system, comprising:

a Mobile Station (MS) for transmitting, to a Base Station (BS), a Subscriber Station(SS) Basic Capability negotiation REQuest (SBC-REQ) message including HARQ buffer capability information having downlink HARQ buffer capability information indicating a downlink HARQ buffer capability, and uplink HARQ buffer capability information indicating an uplink HARQ buffer capability, wherein the downlink HARQ buffer capability information indicates a maximal number of data bits the MS is able to store for a downlink HARQ and includes one of a first type indicating a downlink HARQ buffer capability for total downlink HARQ channels and a second type indicating a downlink HARQ buffer capability for each downlink HARQ channel, and wherein the uplink HARQ buffer capability information indicates a maximal number of data bits the MS is able to store for an uplink HARQ and includes one of indicating an uplink HARQ buffer capability for total uplink HARQ channels and indicating an uplink HARQ buffer capability for each uplink HARQ channel.

12. The system as claimed in claim 11, wherein each of the downlink and uplink HARQ buffer capabilities is available for an Incremental Redundancy scheme.

13. The system as claimed in claim 11, wherein each of the downlink and uplink HARQ buffer capabilities is available for a Chase Combining (CC) scheme or both of an Incremental Redundancy scheme and the CC scheme.

14. The system as claimed in claim 11, wherein the downlink HARQ buffer capability information further includes a bit indicating whether the downlink HARQ buffer capability information includes the first type or the second type, and the uplink HARQ buffer capability information further includes a bit indicating whether the uplink HARQ buffer capability information includes one of the indication of the unlink HARQ buffer capability for the total uplink HARQ channels and the indication of the uplink HARQ buffer capability for each uplink HARQ channel.

15. A system for receiving Hybrid Automatic Repeat reQuest (HARQ) buffer capability information in a broadband wireless access communication system, comprising:

a Base Station (BS) for receiving, from a Mobile Station (MS), a Subscriber Station(SS) Basic Capability negotiation REQuest (SBC-REQ) message including HARQ buffer capability information having downlink HARQ buffer capability information indicating a downlink HARQ buffer capability, and uplink HARQ buffer capability information indicating an uplink HARQ buffer capability, wherein the downlink HARQ buffer capability information indicates a maximal number of data bits the MS is able to store for a downlink HARQ and includes one of a first type indicating a downlink HARQ buffer capability for total downlink HARQ channels and a second type indicating a downlink HARQ buffer capability for each downlink HARQ channel, and wherein the uplink HARQ buffer capability information indicates a maximal number of data bits the MS is able to store for an uplink HARQ and includes one of indicating an uplink HARQ buffer capability for total uplink HARQ channels and indicating an uplink HARQ buffer capability for each uplink HARQ channel.

16. The system as claimed in claim 15, wherein each of the downlink and uplink HARQ buffer capabilities is available for an Incremental Redundancy scheme.

17. The system as claimed in claim 15, wherein each of the downlink and uplink HARQ buffer capabilities is available for a Chase Combining (CC) scheme or both of an Incremental Redundancy scheme and the CC scheme.

18. The system as claimed in claim 15, wherein the downlink HARQ buffer capability information further includes a bit indicating whether the downlink HARQ buffer capability information includes the first type or the second type, and the uplink HARQ buffer capability information further includes a bit indicating whether the uplink HARQ buffer capability information includes the indication of the uplink HARQ buffer capability for the total uplink HARQ channels and the indication of the uplink HARQ buffer capability for each uplink HARQ channel.

19. A system for transmitting Hybrid Automatic Repeat reQuest (HARQ) buffer capability information in a broadband wireless access communication system, comprising:

a Mobile Station (MS) for transmitting, to a Base Station (BS), a Subscriber Station(SS) Basic Capability negotiation REQuest (SBC-REQ) message including HARQ buffer capability information having downlink HARQ buffer capability information indicating a downlink HARQ buffer capability, and an uplink HARQ buffer capability information indicating uplink HARQ buffer capability, wherein, when the HARQ buffer capability information is indicated using 16 bits from b15 to b0, the downlink HARQ buffer capability information is indicated using 8 bits b7 to b0 and 3 bits b7 to b5 are set as reserved bits, 1 bit b4 is to indicate whether the downlink HARQ buffer capability represents one of a downlink HARQ buffer capability for total downlink HARQ channels and a packet size (Nep) per downlink HARQ channel, and 4 bits b3 to b0 are set to indicate the Nep per downlink HARQ channel when 1 bit b4 indicates that the downlink HARQ buffer capability represents the Nep per downlink HARQ channel, wherein the uplink HARQ buffer capability information is indicated using 8 bits b15 to b8, 3 bits b15 to b13 are set as reserved bits, 1 bit b12 is set to indicate whether the uplink HARQ buffer capability represents one of an uplink HARQ buffer capability for total uplink HARQ channels and an Nep per uplink HARQ channel, and 4 bits b11 to b8 are set to indicate the Nep per uplink HARQ channel when 1 bit b12 indicates that the uplink HARQ buffer capability for the total uplink HARQ channels represents the NEP per uplink HARQ channel, and wherein the downlink and uplink HARQ buffer capabilities are available for an Incremental Redundancy scheme.

20. A system for receiving Hybrid Automatic Repeat reQuest (HARQ) buffer capability information in a broadband wireless access communication system, comprising:

a Base Station (BS) for receiving, from a Mobile Station (MS), a Subscriber Station(SS) Basic Capability negotiation REQuest message which includes HARQ buffer capability information having downlink HARQ buffer capability information indicating a downlink HARQ buffer capability, and an uplink HARQ buffer capability information indicating uplink HARQ buffer capability, wherein, when the HARQ buffer capability information is indicated using 16 bits from b15 to b0, the downlink HARQ buffer capability information is indicated using 8 bits b7 to b0, and 3 bits b7 to b5 are set as reserved bits, 1 bit b4 is set to indicate whether the downlink HARQ buffer capability represents one of a downlink HARQ buffer capability for total downlink HARQ channels and a packet size (Nep) per downlink HARQ channel, and 4 bits b3 to b0 are set to indicate the Nep per downlink HARQ channel when 1 bit b4 indicates that the downlink HARQ buffer capability represents the Nep per downlink HARQ channel wherein the uplink HARQ buffer capability information is indicated using 8 bits b15 to b8, 3 bits b15 to b13 are set as reserved bits, 1 bit, b12 is set to indicate whether the uplink HARQ buffer capability represents one of an uplink HARQ buffer capability for total uplink HARQ channels and an Nep per uplink HARQ channel, and 4 bits b11 to b8 are set to indicate the Nep per uplink HARQ channel when 1 bit b12 indicates that the uplink HARQ buffer capability for the total uplink HARQ channels represents the Nep per uplink HARQ channel, and wherein the downlink and uplink HARQ buffer capabilities are available for an Incremental Redundancy scheme.

* * * * *